US012585794B2

(12) United States Patent
Le et al.

(10) Patent No.: US 12,585,794 B2
(45) Date of Patent: Mar. 24, 2026

(54) NETWORK DEVICE AND DATA DECRYPTION METHOD

(71) Applicant: Huawei Technologies Co., Ltd., Shenzhen (CN)

(72) Inventors: Weizhi Le, Shenzhen (CN); Bin Cao, Bangkok (TH)

(73) Assignee: Huawei Technologies Co., Ltd., Shenzhen (CN)

( * ) Notice: Subject to any disclaimer, the term of this patent is extended or adjusted under 35 U.S.C. 154(b) by 26 days.

(21) Appl. No.: 18/640,510

(22) Filed: Apr. 19, 2024

(65) Prior Publication Data

US 2024/0265119 A1    Aug. 8, 2024

Related U.S. Application Data

(63) Continuation of application No. PCT/CN2022/125738, filed on Oct. 17, 2022.

(30) Foreign Application Priority Data

Oct. 20, 2021    (CN) .......................... 202111223283.2

(51) Int. Cl.
| | | |
|---|---|---|
| *G06F 21/60* | (2013.01) | |
| *G06F 21/72* | (2013.01) | |
| *G06F 21/79* | (2013.01) | |

(52) U.S. Cl.
CPC ............ *G06F 21/602* (2013.01); *G06F 21/72* (2013.01); *G06F 21/79* (2013.01)

(58) Field of Classification Search
CPC ........ G06F 21/602; G06F 21/72; G06F 21/79; G06F 21/572; G06F 21/60; H04L 67/34; H04L 9/08; H04L 9/0822; H04L 9/0863; H04L 9/40
See application file for complete search history.

(56) References Cited

U.S. PATENT DOCUMENTS

| | | | | |
|---|---|---|---|---|
| 9,860,240 | B2 * | 1/2018 | Webb ........................ | H04L 9/14 |
| 2010/0091995 | A1 * | 4/2010 | Chen ..................... | H04L 9/0869 |
| | | | | 380/278 |
| 2010/0169645 | A1 * | 7/2010 | McGrew .............. | H04L 9/0637 |
| | | | | 380/268 |
| 2010/0290624 | A1 | 11/2010 | Buer et al. | |
| 2013/0238900 | A1 * | 9/2013 | Leggette .............. | G06F 9/5077 |
| | | | | 713/165 |
| 2015/0235053 | A1 | 8/2015 | Lee et al. | |
| 2016/0006564 | A1 | 1/2016 | Glider et al. | |
| 2017/0085551 | A1 * | 3/2017 | Webb ..................... | G06F 21/74 |
| 2019/0296896 | A1 * | 9/2019 | Resch ................... | H04L 9/0656 |
| 2020/0210168 | A1 * | 7/2020 | Farrell .................. | H03M 13/09 |

FOREIGN PATENT DOCUMENTS

| | | | | | |
|---|---|---|---|---|---|
| WO | WO-2004032410 A1 * | 4/2004 | ......... | H04N 21/4334 |
| WO | WO-2020151614 A1 * | 7/2020 | .............. | H04L 9/40 |

* cited by examiner

*Primary Examiner* — John B King
(74) *Attorney, Agent, or Firm* — Slater Matsil, LLP

(57) ABSTRACT

In accordance with an embodiment, a network device includes a chip including a hardware encryption and decryption circuit and a one-time programmable (OTP) storage area; and a receiver configured to receive a to-be-decrypted file, where the to-be-decrypted file comprises a ciphertext. The hardware encryption and decryption circuit is configured to obtain a root key plaintext from the OTP storage area, and decrypt the ciphertext using the root key plaintext to obtain a plaintext.

20 Claims, 6 Drawing Sheets

NETWORK DEVICE AND DATA DECRYPTION METHOD

CROSS-REFERENCE TO RELATED APPLICATIONS

This application is a continuation of International Application No. PCT/CN2022/125738, filed on Oct. 17, 2022, which claims priority to Chinese Patent Application No. 202111223283.2, filed on Oct. 20, 2021. The disclosures of the aforementioned applications are hereby incorporated by reference in their entireties.

TECHNICAL FIELD

This application relates to the field of encryption and decryption, and in particular, to a network device and a data decryption method.

BACKGROUND

Device vendors may update software such as a basic input/output system (BIOS), an operating system (OS), or an application program on a network device by sending a device software package to the network device. However, hackers may intercept the device software package on a communication link. If the device software package is obtained by the hackers, the hackers may perform binary reverse analysis to obtain information that helps attack the software. Therefore, device vendors may set a root key plaintext on the network device before delivery of the network device. Before sending the device software package to the network device, the device vendors encrypt the device software package by using the root key plaintext. After receiving an encrypted software package ciphertext, the network device decrypts the software package ciphertext by using the root key plaintext, to obtain a software package plaintext.

During actual application, the root key plaintext may also be intercepted by hackers, and the hackers may decrypt the software package ciphertext by using the root key plaintext. Consequently, security of the network device is reduced.

SUMMARY

This application provides a network device and a data decryption method. A root key plaintext in an OTP storage area of a network device cannot be read by an application program outside a chip. Therefore, security of the network device can be improved.

A first aspect of this application provides a network device. The network device includes a hardware encryption and decryption component, a one-time programmable (OTP) storage area, and a receiver. The hardware encryption and decryption component and the OTP storage area may be integrated into a chip of the network device. The hardware encryption and decryption component is a logic program protected by the chip. Specifically, the logic program of the hardware encryption and decryption component may be a logic circuit or a combination of a logic circuit and software code. The logic circuit or the software code of the hardware encryption and decryption component is inside the chip. An application program outside the chip cannot modify or obtain related data of the hardware encryption and decryption component in a processing process. Similarly, the OTP storage area is also protected by the chip. Data in the OTP storage area cannot be modified or read by the application program outside the chip. The receiver is configured to receive a to-be-decrypted file. The to-be-decrypted file includes a ciphertext. The hardware encryption and decryption component is configured to obtain a root key plaintext from the OTP storage area, and decrypt the ciphertext by using the root key plaintext, to obtain a plaintext. The ciphertext is encrypted data. The plaintext is unencrypted or decrypted data.

In this application, the root key plaintext in the OTP storage area cannot be read by the application program outside the chip. Therefore, security of the network device can be improved.

In an optional manner of the first aspect, the hardware encryption and decryption component is configured to obtain a root key ciphertext from the OTP storage area. The hardware encryption and decryption component decrypts the root key ciphertext by using a first keying material and a key, to obtain the root key plaintext. The root key plaintext is obtained by using the root key ciphertext, the first keying material, and the key. Therefore, in this application, security of the network device can be further improved.

In an optional manner of the first aspect, the hardware encryption and decryption component is further configured to obtain the key and the first keying material from the to-be-decrypted file. The root key plaintext may be flexibly changed by changing the key or the first keying material in the to-be-decrypted file. Therefore, in this application, security of the network device can be further improved.

In an optional manner of the first aspect, the to-be-decrypted file further includes a second keying material. The hardware encryption and decryption component is configured to derive the root key plaintext by using the second keying material, to obtain a subkey. The hardware encryption and decryption component is used to decrypt the ciphertext by using the subkey, to obtain the plaintext. The subkey is obtained by using the root key plaintext, so that security of the network device can be further improved.

In an optional manner of the first aspect, the to-be-decrypted file further includes first encryption indication information. The hardware encryption and decryption component is further configured to determine, based on the first encryption indication information, whether to decrypt the ciphertext. During actual application, the network device may alternatively receive the plaintext. The network device cannot determine whether the to-be-decrypted file carries the ciphertext or the plaintext. If the first encryption indication information indicates that decryption is not required, it indicates that the to-be-decrypted file carries the plaintext, and the network device does not need to decrypt the plaintext. If the first encryption indication information indicates that decryption is required, it indicates that the to-be-decrypted file carries the ciphertext, and the network device needs to decrypt the ciphertext. Therefore, in this application, flexibility of encryption and decryption can be improved. For example, a device vendor may choose not to encrypt unimportant software.

In an optional manner of the first aspect, the OTP storage area stores second encryption indication information. The hardware encryption and decryption component is configured to determine, based on the first encryption indication information and the second encryption indication information, whether to decrypt the ciphertext. Specifically, when the second encryption indication information and the first encryption indication information indicate that decryption is required, the hardware encryption and decryption component determines to decrypt the ciphertext. When the second encryption indication information indicates that decryption is required, and the first encryption indication information indicates that decryption is not required, the hardware encryption and decryption component sends an alarm. When the second encryption indication information and the first encryption indication information indicate that decryption is not required, the hardware encryption and decryption component determines not to decrypt the ciphertext. When the second encryption indication information indicates that decryption is not required, and the first encryption indication information indicates that decryption is required, the hardware encryption and decryption component sends an alarm. When the hardware encryption and decryption component sends the alarm, the hardware encryption and decryption component may not decrypt the ciphertext.

Therefore, in this application, some network devices may be forcibly installed only with a software package ciphertext or a software package plaintext, to improve flexibility of the network device in adapting to different scenarios.

In an optional manner of the first aspect, the to-be-decrypted file further includes first algorithm type indication information. The hardware encryption and decryption component is further configured to determine a target encryption and decryption algorithm in the hardware encryption and decryption component based on the first algorithm type indication information. The hardware encryption and decryption component is configured to decrypt the ciphertext by using the target encryption and decryption algorithm and the root key plaintext, to obtain the plaintext. A plurality of decryption algorithms may be preset in the hardware encryption and decryption component. The hardware encryption and decryption component selects the target encryption and decryption algorithm from the plurality of decryption algorithms based on the first algorithm type indication information. Therefore, in this application, a decryption algorithm can be flexibly selected, thereby improving security of the network device.

In an optional manner of the first aspect, the OTP storage area includes second algorithm type indication information. An algorithm type indicated by the second algorithm type indication information covers an algorithm type indicated by the first algorithm type indication information. The hardware encryption and decryption component is configured to determine the target encryption and decryption algorithm in the hardware encryption and decryption component based on the first algorithm type indication information and the second algorithm type indication information. When the algorithm type indicated by the second algorithm type indication information covers the algorithm type indicated by the first algorithm type indication information, the hardware encryption and decryption component selects the target encryption and decryption algorithm indicated by the first algorithm type indication information. When the algorithm type indicated by the second algorithm type indication information does not cover the algorithm type indicated by the first algorithm type indication information, the hardware encryption and decryption component may send an alarm. The hardware encryption and decryption component decrypts the ciphertext without using the algorithm type indicated by the first algorithm type indication information. Therefore, in this application, some network devices may be forced to perform a specific encryption and decryption algorithm, to improve security of the network device.

In an optional manner of the first aspect, the plurality of encryption and decryption algorithms in the hardware encryption and decryption component share the root key ciphertext. OTP storage space in the chip is limited. The root key ciphertext is shared, so that storage space can be saved, thereby reducing costs of the network device.

In an optional manner of the first aspect, the ciphertext is a BIOS ciphertext, an OS ciphertext, or an application program ciphertext.

A second aspect of this application provides a data decryption method. The data decryption method is applied to a network device. The network device includes a chip and a receiver. The chip includes a hardware encryption and decryption component and an OTP storage area. The data decryption method includes the following steps: The network device receives a to-be-decrypted file by using the receiver. The to-be-decrypted file includes a ciphertext. The network device obtains a root key plaintext from the OTP storage area. The network device decrypts the ciphertext by using the hardware encryption and decryption component and the root key plaintext, to obtain a plaintext. The hardware encryption and decryption component and the OTP storage area may be integrated into the chip of the network device. The hardware encryption and decryption component is a logic program protected by the chip. Specifically, the logic program of the hardware encryption and decryption component may be a logic circuit or a combination of a logic circuit and software code. The logic circuit or the software code of the hardware encryption and decryption component is inside the chip. An application program outside the chip cannot modify or obtain related data of the hardware encryption and decryption component in a processing process. Similarly, the OTP storage area is also protected by the chip. Data in the OTP storage area cannot be modified or read by the application program outside the chip.

In this application, the root key plaintext in the OTP storage area cannot be read by the application program outside the chip. Therefore, security of the network device can be improved.

In an optional manner of the second aspect, the network device obtains a root key ciphertext from the OTP storage area. The network device decrypts the root key ciphertext by using the hardware encryption and decryption component, a first keying material, and a key, to obtain the root key plaintext.

In an optional manner of the second aspect, before that the network device decrypts the root key ciphertext, to obtain the root key plaintext, the data decryption method further includes the following step: The network device obtains the key and the first keying material from the to-be-decrypted file.

In an optional manner of the second aspect, the to-be-decrypted file further includes a second keying material. The network device derives the root key plaintext by using the hardware encryption and decryption component and the second keying material, to obtain a subkey. The network device decrypts the ciphertext by using the hardware encryption and decryption component and the subkey, to obtain the plaintext.

In an optional manner of the second aspect, the to-be-decrypted file further includes first encryption indication information. Before that the network device decrypts the ciphertext by using the hardware encryption and decryption component and the root key plaintext, to obtain a plaintext, the data decryption method further includes the following step: The network device determines, based on the first encryption indication information, whether to decrypt the ciphertext. If the first encryption indication information indicates that decryption is not required, it indicates that the network device receives the plaintext, and the network device does not need to decrypt the plaintext. If the first encryption indication information indicates that decryption is required, it indicates that the network device receives the ciphertext, and the network device needs to decrypt the ciphertext.

In an optional manner of the second aspect, the OTP storage area includes second encryption indication information. The network device determines, based on the first encryption indication information and the second encryption indication information, whether to decrypt the ciphertext. Specifically, when the second encryption indication information and the first encryption indication information indicate that decryption is required, the hardware encryption and decryption component determines to decrypt the ciphertext. When the second encryption indication information indicates that decryption is required, and the first encryption indication information indicates that decryption is not required, the hardware encryption and decryption component sends an alarm. When the second encryption indication information and the first encryption indication information indicate that decryption is not required, the hardware encryption and decryption component determines not to decrypt the ciphertext. When the second encryption indication information indicates that decryption is not required, and the first encryption indication information indicates that decryption is required, the hardware encryption and decryption component sends an alarm. When the hardware encryption and decryption component sends the alarm, the hardware encryption and decryption component may not decrypt the ciphertext.

In an optional manner of the second aspect, the to-be-decrypted file further includes first algorithm type indication information. Before that the network device decrypts the ciphertext by using the hardware encryption and decryption component and the root key plaintext, to obtain a plaintext, the data decryption method further includes the following step: The network device determines a target encryption and decryption algorithm in the hardware encryption and decryption component based on the first algorithm type indication information. The network device decrypts the ciphertext based on the target encryption and decryption algorithm and the root key plaintext, to obtain the plaintext.

In an optional manner of the second aspect, the OTP storage area includes second algorithm type indication information. An algorithm type indicated by the second algorithm type indication information covers an algorithm type indicated by the first algorithm type indication information. The network device determines the target encryption and decryption algorithm in the hardware encryption and decryption component based on the first algorithm type indication information and the second algorithm type indication information. When the algorithm type indicated by the second algorithm type indication information does not cover the algorithm type indicated by the first algorithm type indication information, the hardware encryption and decryption component may send an alarm. The hardware encryption and decryption component decrypts the ciphertext without using the algorithm type indicated by the first algorithm type indication information.

A third aspect of this application provides an encryption device. The encryption device includes a processor and a transceiver. The processor is configured to encrypt a plaintext based on a root key plaintext, to obtain a ciphertext. The transceiver is configured to send a to-be-decrypted file to a network device. The to-be-decrypted file includes the ciphertext. The network device includes a chip and a receiver. The chip includes a hardware encryption and decryption component and an OTP storage area.

The OTP storage area stores related information of the root key plaintext. The ciphertext is used by the hardware encryption and decryption component to decrypt the ciphertext by using the root key plaintext, to obtain a plaintext.

In an optional manner of the third aspect, the OTP storage area stores a root key ciphertext. The root key ciphertext is used by the hardware encryption and decryption component to decrypt the root key ciphertext by using a first keying material and a key, to obtain the root key plaintext.

In an optional manner of the third aspect, the to-be-decrypted file further includes the key and the first keying material.

In an optional manner of the third aspect, the to-be-decrypted file further includes a second keying material. The second keying material is used by the hardware encryption and decryption component to derive the root key plaintext by using the second keying material, to obtain a subkey. That the ciphertext is used by the hardware encryption and decryption component to decrypt the ciphertext by using the root key plaintext, to obtain a plaintext includes: The ciphertext is used by the hardware encryption and decryption component to decrypt the ciphertext by using the subkey, to obtain the plaintext.

In an optional manner of the third aspect, the to-be-decrypted file further includes first encryption indication information. The first encryption indication information is used by the hardware encryption and decryption component to determine, based on the first encryption indication information, whether to decrypt the ciphertext. If the first encryption indication information indicates that decryption is not required, it indicates that the network device receives the plaintext, and the network device does not need to decrypt the plaintext. If the first encryption indication information indicates that decryption is required, it indicates that the network device receives the ciphertext, and the network device needs to decrypt the ciphertext.

In an optional manner of the third aspect, the OTP storage area stores second encryption indication information. That the first encryption indication information is used by the hardware encryption and decryption component to determine, based on the first encryption indication information, whether to decrypt the ciphertext includes: The hardware encryption and decryption component is used by the hardware encryption and decryption component to determine, based on the first encryption indication information and the second encryption indication information, whether to decrypt the ciphertext. When the second encryption indication information and the first encryption indication information indicate that decryption is required, the hardware encryption and decryption component determines to decrypt the ciphertext. When the second encryption indication information indicates that decryption is required, and the first encryption indication information indicates that decryption is not required, the hardware encryption and decryption component sends an alarm. When the second encryption indication information and the first encryption indication information indicate that decryption is not required, the hardware encryption and decryption component determines not to decrypt the ciphertext. When the second encryption indication information indicates that decryption is not required, and the first encryption indication information indicates that decryption is required, the hardware encryption and decryption component sends an alarm.

In an optional manner of the third aspect, the to-be-decrypted file further includes first algorithm type indication information. The first algorithm type indication information is used by the hardware encryption and decryption component to determine a target encryption and decryption algorithm in the hardware encryption and decryption component based on the first algorithm type indication information. That the ciphertext is used by the hardware encryption and decryption component to decrypt the ciphertext by using the root key plaintext, to obtain a plaintext includes: The ciphertext is used by the hardware encryption and decryption component to decrypt the ciphertext by using the target encryption and decryption algorithm and the root key plaintext, to obtain the plaintext.

In an optional manner of the third aspect, the OTP storage area includes second algorithm type indication information. An algorithm type indicated by the second algorithm type indication information covers an algorithm type indicated by the first algorithm type indication information. That the first algorithm type indication information is used by the hardware encryption and decryption component to determine a target encryption and decryption algorithm in the hardware encryption and decryption component based on the first algorithm type indication information includes: The first algorithm type indication information is used by the hardware encryption and decryption component to determine the target encryption and decryption algorithm in the hardware encryption and decryption component based on the first algorithm type indication information and the second algorithm type indication information. When the algorithm type indicated by the second algorithm type indication information does not cover the algorithm type indicated by the first algorithm type indication information, the hardware encryption and decryption component may send an alarm, and decrypt the ciphertext without using the algorithm type indicated by the first algorithm type indication information.

In an optional manner of the third aspect, a plurality of encryption and decryption algorithms in the hardware encryption and decryption component share the root key ciphertext.

In an optional manner of the third aspect, the ciphertext is a BIOS ciphertext, an OS ciphertext, or an application program ciphertext.

A fourth aspect of this application provides a data encryption method. The data encryption method includes the following steps: An encryption device encrypts a plaintext based on a root key plaintext, to obtain a ciphertext. The encryption device sends a to-be-decrypted file to a network device. The to-be-decrypted file includes the ciphertext. The network device includes a chip and a receiver. The chip includes a hardware encryption and decryption component and an OTP storage area. The OTP storage area stores related information of the root key plaintext. The ciphertext is used by the hardware encryption and decryption component to decrypt the ciphertext by using the root key plaintext, to obtain a plaintext.

In an optional manner of the fourth aspect, the OTP storage area stores a root key ciphertext. The root key ciphertext is used by the hardware encryption and decryption component to decrypt the root key ciphertext by using a first keying material and a key, to obtain the root key plaintext.

In an optional manner of the fourth aspect, the to-be-decrypted file further includes the key and the first keying material.

In an optional manner of the fourth aspect, the to-be-decrypted file further includes a second keying material. The second keying material is used by the hardware encryption and decryption component to derive the root key plaintext by using the second keying material, to obtain a subkey. That the ciphertext is used by the hardware encryption and decryption component to decrypt the ciphertext by using the root key plaintext, to obtain a plaintext includes: The ciphertext is used by the hardware encryption and decryption component to decrypt the ciphertext by using the subkey, to obtain the plaintext.

In an optional manner of the fourth aspect, the to-be-decrypted file further includes first encryption indication information. The first encryption indication information is used by the hardware encryption and decryption component to determine, based on the first encryption indication information, whether to decrypt the ciphertext. If the first encryption indication information indicates that decryption is not required, it indicates that the network device receives the plaintext, and the network device does not need to decrypt the plaintext. If the first encryption indication information indicates that decryption is required, it indicates that the network device receives the ciphertext, and the network device needs to decrypt the ciphertext.

In an optional manner of the fourth aspect, the OTP storage area stores second encryption indication information. That the first encryption indication information is used by the hardware encryption and decryption component to determine, based on the first encryption indication information, whether to decrypt the ciphertext includes: The hardware encryption and decryption component is used by the hardware encryption and decryption component to determine, based on the first encryption indication information and the second encryption indication information, whether to decrypt the ciphertext. When the second encryption indication information and the first encryption indication information indicate that decryption is required, the hardware encryption and decryption component determines to decrypt the ciphertext. When the second encryption indication information indicates that decryption is required, and the first encryption indication information indicates that decryption is not required, the hardware encryption and decryption component sends an alarm. When the second encryption indication information and the first encryption indication information indicate that decryption is not required, the hardware encryption and decryption component determines not to decrypt the ciphertext. When the second encryption indication information indicates that decryption is not required, and the first encryption indication information indicates that decryption is required, the hardware encryption and decryption component sends an alarm.

In an optional manner of the fourth aspect, the to-be-decrypted file further includes first algorithm type indication information. The first algorithm type indication information is used by the hardware encryption and decryption component to determine a target encryption and decryption algorithm in the hardware encryption and decryption component based on the first algorithm type indication information. That the ciphertext is used by the hardware encryption and decryption component to decrypt the ciphertext by using the root key plaintext, to obtain a plaintext includes: The ciphertext is used by the hardware encryption and decryption component to decrypt the ciphertext by using the target encryption and decryption algorithm and the root key plaintext, to obtain the plaintext.

In an optional manner of the fourth aspect, the OTP storage area includes second algorithm type indication information. An algorithm type indicated by the second algorithm type indication information covers an algorithm type indicated by the first algorithm type indication information. That the first algorithm type indication information is used by the hardware encryption and decryption component to determine a target encryption and decryption algorithm in the hardware encryption and decryption component based on the first algorithm type indication information includes: The first algorithm type indication information is used by the hardware encryption and decryption component to determine the target encryption and decryption algorithm in the hardware encryption and decryption component based on the first algorithm type indication information and the second algorithm type indication information. When the algorithm type indicated by the second algorithm type indication information does not cover the algorithm type indicated by the first algorithm type indication information, the hardware encryption and decryption component may send an alarm, and decrypt the ciphertext without using the algorithm type indicated by the first algorithm type indication information.

DETAILED DESCRIPTION OF ILLUSTRATIVE EMBODIMENTS

This application provides a network device and a data decryption method. A root key plaintext in an OTP storage area of a network device cannot be read by an application program outside a chip. Therefore, security of the network device can be improved.

It should be understood that "first", "second", "target", or the like used in this application is merely used for distinguishing and description, and cannot be understood as an indication or implication of relative importance, or an indication or implication of an order. In addition, for brevity and clarity, reference numbers and/or letters are repeated in a plurality of accompanying drawings of this application. Repetition does not indicate that there is a strict restrictive relationship between various embodiments and/or configurations.

The network device in this application is used in the field of encryption and decryption. In the field of encryption and decryption, a device vendor can improve security of the network device by encrypting a device software package. However, during actual application, the root key plaintext in the network device may be stolen by a hacker. Consequently, security of the network device is reduced.

Figure 1:
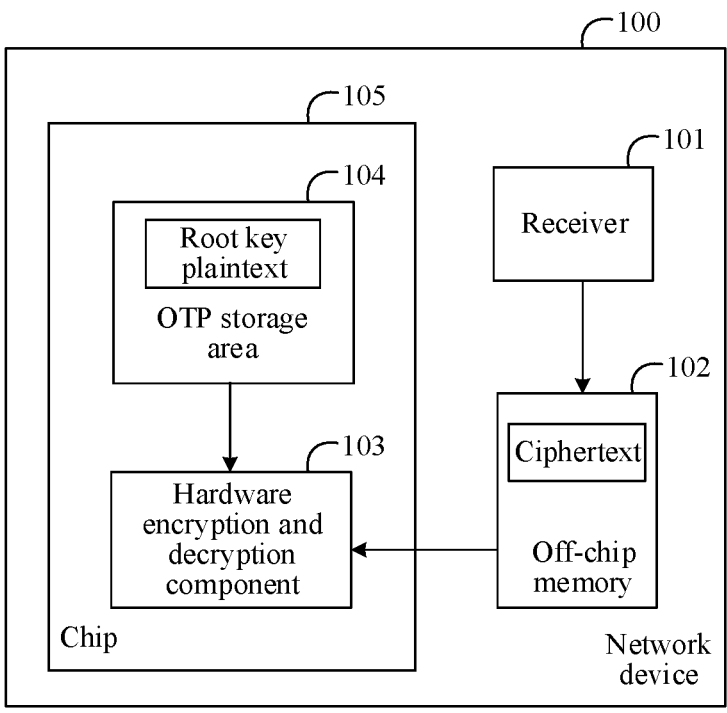
FIG. 1 is a first schematic diagram of a structure of a network device according to this application.

Therefore, this application provides a network device. FIG. 1 is a first schematic diagram of a structure of a network device according to this application. As shown in FIG. 1, the network device 100 includes a receiver 101 and a chip 105. The chip 105 includes an OTP storage area 104 and a hardware encryption and decryption component 103. The chip 105 may be a processor. The processor may be a central processing unit (CPU), a network processor (NP), or a combination of a CPU and an NP. The processor may further include a hardware chip or another general purpose processor. The hardware chip may be an application-specific integrated circuit (ASIC), a programmable logic device (PLD), or a combination thereof.

The hardware encryption and decryption component 103 is a logic program protected by the chip 105. Specifically, the logic program of the hardware encryption and decryption component 103 may be a logic circuit or a combination of a logic circuit and software code. The logic circuit or the software code of the hardware encryption and decryption component 103 is inside the chip 105. An application program outside the chip 105 cannot modify or obtain related data of the hardware encryption and decryption component 103 in a processing process. Similarly, the OTP storage area 104 is also protected by the chip. Data in the OTP storage area 104 cannot be modified or read by the application program outside the chip 105. For example, based on a fuse technology, the application program outside the chip 105 cannot read the data in the OTP storage area 104. In addition, the network device 100 may further generate pseudo data. The application program outside the chip 105 reads the pseudo data from the "OTP storage area 104". The pseudo data can be all 0s or all 1s. The hardware encryption and decryption component 103 may access the OTP storage area 104 by using the logic circuit. The application program outside the chip 105 is an application program whose logic circuit or code is outside the chip. For example, if code of an application program is in an off-chip memory of the network device, the application program is an application program outside the chip 105.

During actual application, the network device 100 may further include an off-chip memory 102. The off-chip memory 102 may be a volatile memory or a non-volatile memory, or both a volatile memory and a non-volatile memory. The non-volatile memory may be a read-only memory (ROM), such as a programmable read-only memory (programmable ROM, PROM), an erasable programmable read-only memory (erasable PROM, EPROM), an electrically erasable programmable read-only memory (EEPROM), a non-volatile flash memory (NOR Flash), or a NAND flash memory. The volatile memory may be a random access memory (RAM), such as a static random access memory (SRAM), a dynamic random access memory (DRAM), a synchronous dynamic random access memory (DRAM), or a double data rate synchronous dynamic random dom access memory (DDR SDRAM).

The receiver 101 may be a transceiver. The transceiver may be a radio frequency module or an optical transceiver module. Alternatively, the transceiver may be a communication protocol module. The network device 100 establishes a secure communication connection to an external entity by using the communication protocol module. The communication protocol module may be a transport layer security (TLS) protocol module, an Internet protocol security (IPsec) module, or the like. The receiver 101 is configured to receive a to-be-decrypted file. The to-be-decrypted file includes a ciphertext. The off-chip memory 102 is configured to store the to-be-decrypted file. The OTP storage area 104 stores related information of a root key plaintext. The related information of the root key plaintext may be written by the network device before delivery. The related information of the root key plaintext may be the root key plaintext, a root key ciphertext, or the like. When the OTP storage area 104 stores the root key plaintext, the hardware encryption and decryption component 103 is configured to obtain the root key plaintext from the OTP storage area 104. The hardware encryption and decryption component 103 is further configured to obtain the ciphertext from the off-chip memory 102. The hardware encryption and decryption component 103 is configured to decrypt the ciphertext by using the root key plaintext, to obtain a plaintext.

In this application, the root key plaintext in the OTP storage area 104 cannot be read by the application program outside the chip. Therefore, security of the network device can be improved.

Figure 2:
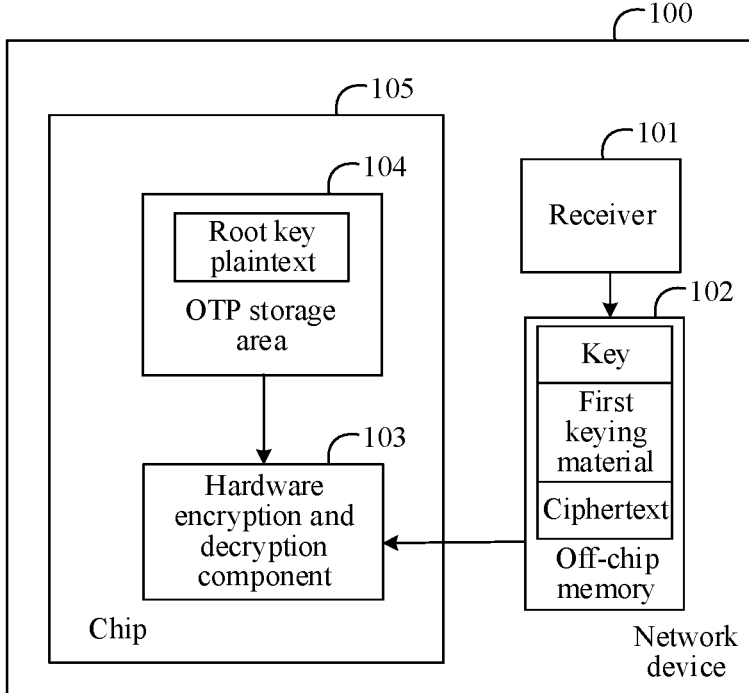
FIG. 2 is a second schematic diagram of a structure of a network device according to this application.

During actual application, usually, the root key plaintext in the OTP storage area 104 can be written only once. Therefore, to facilitate upgrade of the root key plaintext, the OTP storage area 104 may store the root key ciphertext. For example, FIG. 2 is a second schematic diagram of a structure of a network device according to this application. As shown in FIG. 2, the network device 100 includes a receiver 101, an off-chip memory 102, and a chip 105. The chip 105 includes an OTP storage area 104 and a hardware encryption and decryption component 103. The OTP storage area 104 stores a root key ciphertext. A to-be-decrypted file received by the receiver 101 includes a ciphertext, a key, and a first keying material. The off-chip memory 102 is configured to store the to-be-decrypted file. The hardware encryption and decryption component 103 is configured to obtain the root key ciphertext from the OTP storage area 104. The hardware encryption and decryption component 103 is further configured to obtain the key and the first keying material from the off-chip memory 102. The hardware encryption and decryption component 103 is configured to obtain a root key plaintext based on the root key ciphertext, the key, and the first keying material. The hardware encryption and decryption component 103 is further configured to obtain the ciphertext from the off-chip memory 102. The hardware encryption and decryption component 103 is configured to decrypt the ciphertext by using the root key plaintext, to obtain a plaintext.

It should be understood that, in a scenario in which the root key plaintext does not need to be upgraded, the key and the first keying material may be stored in the OTP storage area 104. In this case, the hardware encryption and decryption component 103 is configured to obtain the root key ciphertext, the key, and the first keying material from the OTP storage area 104. The hardware encryption and decryption component 103 is configured to obtain the ciphertext from the off-chip memory 102. After obtaining the root key plaintext based on the root key ciphertext, the key, and the first keying material, the hardware encryption and decryption component 103 is configured to decrypt the ciphertext by using the root key plaintext, to obtain the plaintext.

Figure 3:
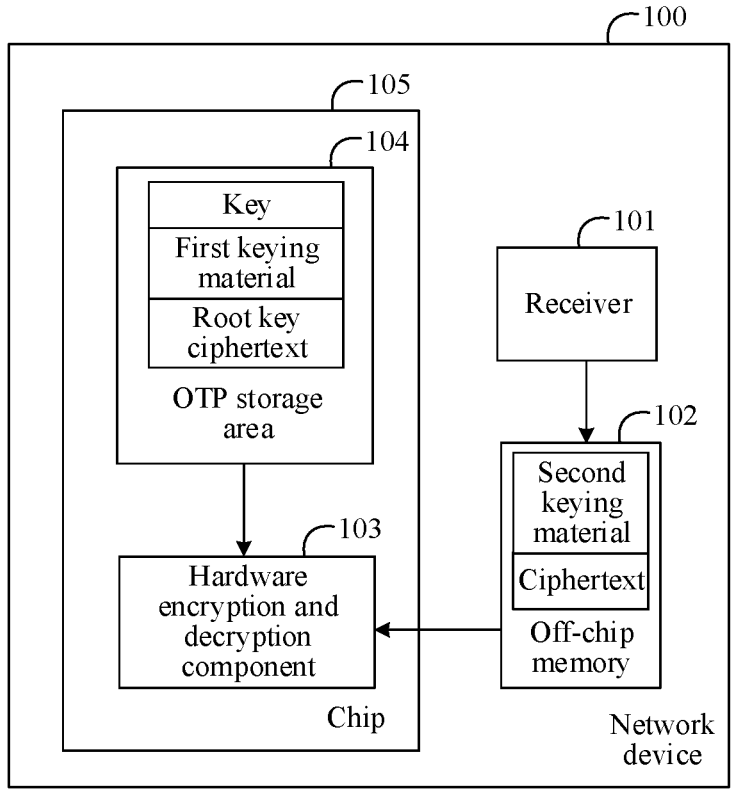
FIG. 3 is a third schematic diagram of a structure of a network device according to this application.

During actual application, to improve security of the network device, the hardware encryption and decryption component 103 may obtain a subkey based on the root key plaintext. The hardware encryption and decryption component 103 decrypts the ciphertext by using the subkey, to obtain the plaintext. For example, FIG. 3 is a third schematic diagram of a structure of a network device according to this application. As shown in FIG. 3, the network device 100 includes a receiver 101, an off-chip memory 102, and a chip 105. The chip 105 includes an OTP storage area 104 and a hardware encryption and decryption component 103. The OTP storage area 104 stores a key, a first keying material, and a root key ciphertext. A to-be-decrypted file received by the receiver 101 includes a ciphertext and a second keying material. The off-chip memory 102 is configured to store the to-be-decrypted file. The hardware encryption and decryption component 103 is configured to obtain the key, the first keying material, and the root key ciphertext from the OTP storage area 104. The hardware encryption and decryption component 103 is configured to obtain a root key plaintext based on the root key ciphertext, the key, and the first keying material. The hardware encryption and decryption component 103 is further configured to obtain the second keying material from the off-chip memory 102. The hardware encryption and decryption component 103 is configured to derive the root key plaintext by using the second keying material, to obtain a subkey. The hardware encryption and decryption component 103 is further configured to obtain the ciphertext from the off-chip memory 102. The hardware encryption and decryption component 103 is configured to decrypt the ciphertext by using the subkey, to obtain a plaintext.

Figure 4:
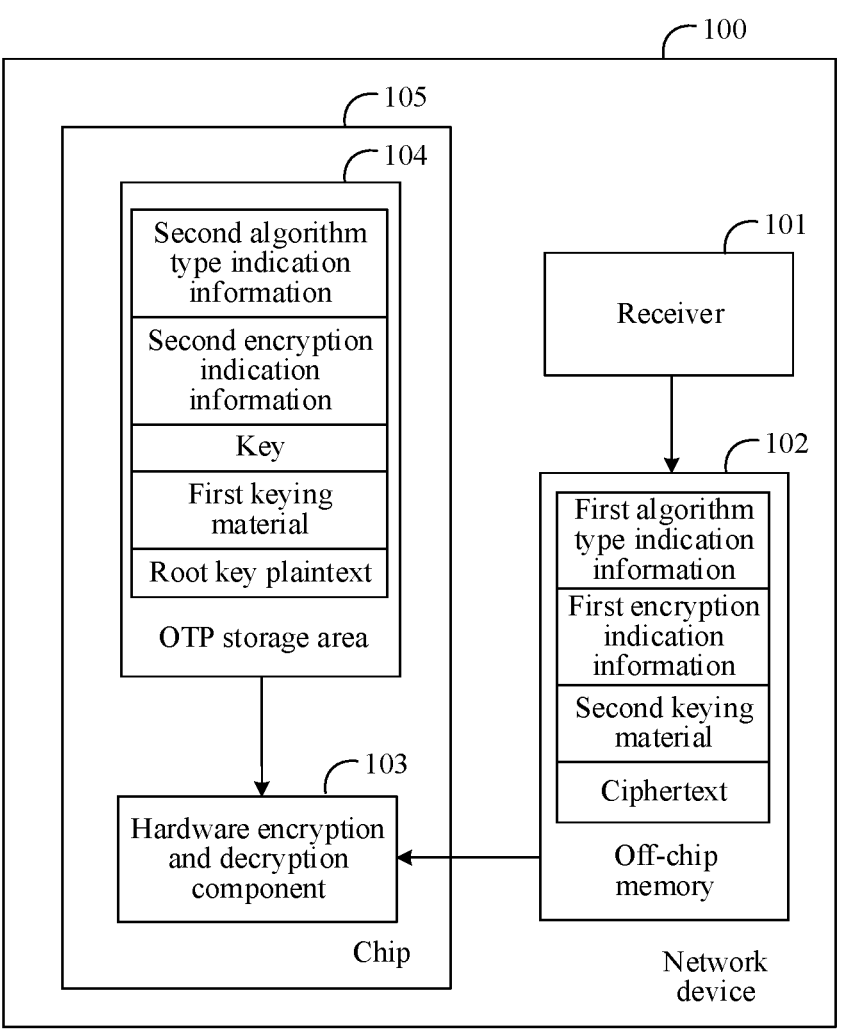
FIG. 4 is a fourth schematic diagram of a structure of a network device according to this application.

During actual application, the receiver 101 may alternatively receive a to-be-decrypted file carrying a plaintext. The network device 100 cannot determine whether the to-be-decrypted file carries the ciphertext or the plaintext. Therefore, the to-be-decrypted file may further include first encryption indication information, and the hardware encryption and decryption component 103 determines, based on the first encryption indication information, whether to decrypt the ciphertext in the to-be-decrypted file. For example, FIG. 4 is a fourth schematic diagram of a structure of a network device according to this application. As shown in FIG. 4, the network device 100 includes a receiver 101, an off-chip memory 102, and a chip 105. The chip 105 includes an OTP storage area 104 and a hardware encryption and decryption component 103. A to-be-decrypted file received by the receiver 101 includes a ciphertext, a second keying material, and first encryption indication information.

When the OTP storage area 104 does not include encryption indication information, if the first encryption indication information indicates that decryption is not required, it indicates that the network device receives a plaintext, and the network device 100 does not need to decrypt the plaintext. The network device 100 may directly load the plaintext. If the first encryption indication information indicates that decryption is required, it indicates that the network device 100 receives a ciphertext, and the network device 100 needs to decrypt the ciphertext. For a specific decryption operation, refer to related descriptions in FIG. 3.

As shown in FIG. 4, during actual application, to improve security of the network device 100, the OTP storage area 104 may store second encryption indication information. The network device 100 may force, by using the second encryption indication information, the network device 100 to be installed only with a software package ciphertext or a software package plaintext.

For example, when the second encryption indication information and the first encryption indication information exist, the network device 100 determines, based on the second encryption indication information, whether to decrypt the ciphertext. Specifically, when the second encryption indication information indicates that decryption is required, the hardware encryption and decryption component 103 decrypts the ciphertext. In this case, even if the first encryption indication information indicates that decryption is not required, that is, the to-be-decrypted file carries the plaintext, the hardware encryption and decryption component 103 also decrypts the plaintext, and obtains an incorrect file. In addition, the network device 100 cannot load the incorrect file. Consequently, the network device 100 may be forcibly installed only with the software package ciphertext. When the second encryption indication information indicates that decryption is not required, the hardware encryption and decryption component 103 does not decrypt the ciphertext. In this case, even if the first encryption indication information indicates that decryption is required, that is, the to-be-decrypted file carries the ciphertext, the hardware encryption and decryption component 103 does not decrypt the ciphertext. The network device 100 cannot load the ciphertext. Consequently, the network device 100 may be forcibly installed only with the software package plaintext.

For example, when the second encryption indication information and the first encryption indication information indicate that decryption is required, the hardware encryption and decryption component 103 determines to decrypt the ciphertext. When the second encryption indication information indicates that decryption is required, and the first encryption indication information indicates that decryption is not required, the hardware encryption and decryption component 103 sends an alarm. When the second encryption indication information and the first encryption indication information indicate that decryption is not required, the hardware encryption and decryption component 103 determines not to decrypt the ciphertext. When the second encryption indication information indicates that decryption is not required, and the first encryption indication information indicates that decryption is required, the hardware encryption and decryption component 103 sends an alarm. When the hardware encryption and decryption component 103 sends the alarm, the hardware encryption and decryption component 103 may not decrypt the ciphertext. Therefore, in this application, the network device 100 may be forcibly installed only with the software package ciphertext or the software package plaintext, to improve flexibility of the network device in adapting to different scenarios.

During actual application, a plurality of encryption and decryption algorithms may be preset in the hardware encryption and decryption component 103. For example, the plurality of encryption and decryption algorithms include international cryptographic algorithms and Chinese cryptographic algorithms. The international cryptographic algorithms are a series of encryption and decryption algorithms dominantly formulated by a foreign standard organization or institution. The international cryptographic algorithms include symmetrical encryption algorithms, asymmetrical encryption algorithms, and cryptographic hash algorithms. The symmetrical encryption algorithms include a data encryption standard (DES), an advanced encryption standard (AES), and the like. The asymmetrical encryption algorithms include a Rivest-Shamir-Adleman (RSA) algorithm, an elliptic curve cryptography (ECC) algorithm, a Diffie-Hellman (DH) algorithm, and the like. The cryptographic hash algorithms include a message digest algorithm 5 (MD5), a secure hash algorithm (SHA), and the like. The Chinese cryptographic algorithms are also referred to as commercial cryptographic algorithms. The Chinese cryptographic algorithms are a series of algorithms formulated by the Office of the State Commercial Cryptography Administration. The Chinese cryptographic algorithms include symmetrical encryption algorithms, elliptic curve asymmetrical encryption algorithms, hash algorithms, and the like. For example, the symmetrical encryption algorithms include SM1 and SM4. SM1 and SM4 can be used to encrypt packet content or data to prevent the packet content or the data from being intercepted or stolen during transmission or storage. SM1 and SM4 correspond to the following international cryptographic algorithms: the DES, a triple data encryption standard (3DES), and the AES. A public key algorithm includes SM2. SM2 is used for entity verification, a digital signature, a digital envelope, and the like. When an Internet key exchange (IKE) protocol is used for automatic negotiation, an SM2 key authentication mode may be used for the IKE negotiation. An international cryptographic algorithm corresponding to SM2 is the RSA. An authentication algorithm includes SM3. SM3 is a 256-bit cryptographic algorithm. SM3 is used for symmetrical key generation and integrity check to determine whether a packet is tampered with during transmission. International cryptographic algorithms corresponding to SM3 are MD5, SHA1, SHA2, and the like.

The to-be-decrypted file may further include first algorithm type indication information. The first algorithm type indication information indicates an encryption and decryption algorithm type of the ciphertext. For example, as shown in FIG. 4, the to-be-decrypted file received by the receiver 101 further includes the first algorithm type indication information. The hardware encryption and decryption component 103 is further configured to determine a target encryption and decryption algorithm in the hardware encryption and decryption component 103 based on the first algorithm type indication information. The hardware encryption and decryption component 103 is configured to decrypt the ciphertext by using the target encryption and decryption algorithm and the root key plaintext, to obtain the plaintext. For example, the first algorithm type indication information is SM1. The hardware encryption and decryption component 103 determines that the target encryption and decryption algorithm is SM1. The hardware encryption and decryption component 103 decrypts the ciphertext by using SM1.

As shown in FIG. 4, during actual application, to flexibly limit the encryption and decryption algorithm type, the OTP storage area 104 may store second algorithm type indication information. The hardware encryption and decryption component 103 determines, based on the second algorithm type indication information and the first algorithm type indication information, an encryption and decryption algorithm to decrypt the ciphertext. When an algorithm type indicated by the second algorithm type indication information covers an algorithm type indicated by the first algorithm type indication information, the hardware encryption and decryption component 103 selects the target encryption and decryption algorithm indicated by the first algorithm type indication information. For example, the second algorithm type indication information indicates that only the Chinese cryptographic algorithms can be used. The algorithm type indicated by the first algorithm type indication information is SM1. SM1 is a Chinese cryptographic algorithm. In this case, the hardware encryption and decryption component 103 decrypts the ciphertext by using SM1. When the algorithm type indicated by the second algorithm type indication information does not cover the algorithm type indicated by the first algorithm type indication information, the hardware encryption and decryption component 103 may send an alarm. The hardware encryption and decryption component 103 decrypts the ciphertext without using the algorithm type indicated by the first algorithm type indication information. For example, the second algorithm type indication information indicates that only the Chinese cryptographic algorithms can be used. The algorithm type indicated by the first algorithm type indication information is the AES. The AES is an international cryptographic algorithm. The Chinese cryptographic algorithms do not cover the AES. In this case, even if the AES encryption and decryption algorithm is set in the hardware encryption and decryption component 103, the hardware encryption and decryption component 103 does not use the AES to decrypt the ciphertext. In addition, the hardware encryption and decryption component 103 may further send an alarm.

It can be learned from the foregoing descriptions that a plurality of encryption and decryption algorithms may be preset in the hardware encryption and decryption component 103. To save space of the OTP storage area, the plurality of encryption and decryption algorithms may share the root key ciphertext. For example, when the hardware encryption and decryption component 103 decrypts different ciphertexts by using SM1 and SM4, the hardware encryption and decryption component 103 uses a same root key ciphertext.

In the foregoing examples in FIG. 1 to FIG. 4, the ciphertext may be a BIOS, an OS, an application program, or the like. When the ciphertext is a BIOS ciphertext, the chip 105 may further include an on-chip program. The on-chip program may be a part of the hardware encryption and decryption component 103. Alternatively, the on-chip program may be a logic program independent of the hardware encryption and decryption component 103. In FIG. 4, the on-chip program reads the second keying material in the off-chip memory 102. The on-chip program is configured to drive the hardware encryption and decryption component 103. The hardware encryption and decryption component 103 is configured to derive a subkey from the root key plaintext. The hardware encryption and decryption component 103 decrypts the BIOS ciphertext by using the subkey, to obtain a BIOS plaintext. After obtaining the plaintext, the on-chip program loads and starts the BIOS. A subsequent ciphertext of the BIOS, for example, the OS or the application program, may no longer be driven by the on-chip program. Specifically, when the ciphertext is an OS cipher-text, the BIOS drives the hardware encryption and decryption component 103 to decrypt the OS ciphertext, to obtain a corresponding OS plaintext. Then, the BIOS loads the OS plaintext. When the ciphertext is an application program ciphertext, the OS drives the hardware encryption and decryption component 103 to decrypt the application program ciphertext, to obtain a corresponding application program plaintext. Then, the OS loads the application program plaintext.

Figure 5:
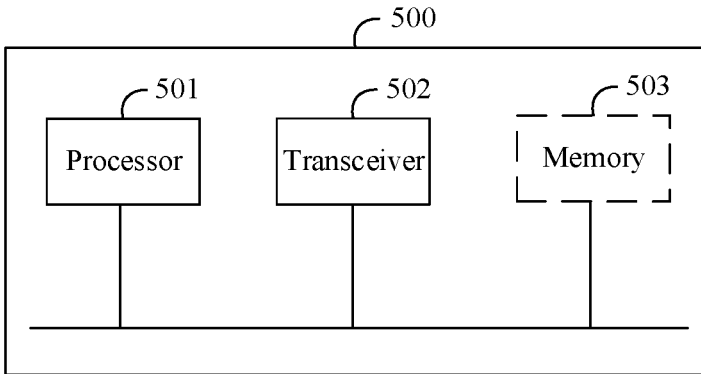
FIG. 5 is a first schematic diagram of a structure of an encryption device according to this application.

The foregoing describes the network device provided in this application, and the following describes an encryption device provided in this application. FIG. 5 is a first schematic diagram of a structure of an encryption device according to this application. As shown in FIG. 5, the encryption device 500 includes a processor 501 and a transceiver 502. For descriptions of the processor 501 and the transceiver 502, refer to the foregoing descriptions of the processor and the transceiver of the network device in FIG. 1.

The processor 501 is configured to encrypt a ciphertext based on a root key plaintext, to obtain a ciphertext. The transceiver 502 is configured to send a to-be-decrypted file to a network device. The to-be-decrypted file includes the ciphertext. The network device includes a chip and a receiver. The chip includes a hardware encryption and decryption component and an OTP storage area. The OTP storage area stores related information of the root key plaintext. The ciphertext is used by the hardware encryption and decryption component to decrypt the ciphertext by using the root key plaintext, to obtain a plaintext. It should be understood that for related descriptions of the network device, refer to the foregoing descriptions of the network device in FIG. 1 to FIG. 4.

For example, the root key plaintext is obtained by the processor 501 based on a root key ciphertext, a first keying material, and a key. The to-be-decrypted file sent by the transceiver 502 further includes the first keying material and the key. In this case, the OTP storage area stores the root key ciphertext. The first keying material and the key are used by the network device to obtain the root key plaintext based on the root key ciphertext, the first keying material, and the key. The network device decrypts the ciphertext by using the root key plaintext, to obtain the plaintext.

For example, the processor 501 is configured to decrypt the ciphertext based on a subkey, to obtain the plaintext. The subkey is obtained by the processor 501 based on the root key plaintext and a second keying material. In this case, the to-be-decrypted file further includes the second keying material. The second keying material is used by the hardware encryption and decryption component to derive the root key plaintext by using the second keying material, to obtain the subkey. The subkey is used by the hardware encryption and decryption component to decrypt the ciphertext by using the subkey, to obtain the plaintext.

For example, the to-be-decrypted file further includes first encryption indication information. The first encryption indication information is used by the hardware encryption and decryption component to determine, based on the first encryption indication information, whether to decrypt the ciphertext. If the first encryption indication information indicates that decryption is not required, it indicates that the to-be-decrypted file carries the plaintext, and the network device does not need to decrypt the plaintext. If the first encryption indication information indicates that decryption is required, it indicates that the to-be-decrypted file carries the ciphertext, and the network device needs to decrypt the ciphertext.

For example, the to-be-decrypted file further includes first algorithm type indication information. The first algorithm type indication information is used by the hardware encryption and decryption component to determine a target encryption and decryption algorithm in the hardware encryption and decryption component based on the first algorithm type indication information. The ciphertext is used by the hardware encryption and decryption component to decrypt the ciphertext by using the target encryption and decryption algorithm and the root key plaintext, to obtain the plaintext. For example, if an algorithm type indicated by the first algorithm type indication information is SM1, the hardware encryption and decryption component decrypts the ciphertext by using SM1, to obtain the plaintext.

During actual application, the encryption device 500 may further include a memory 503. For descriptions of the memory 503, refer to the foregoing related descriptions of the off-chip memory in FIG. 1. The memory 503 may be configured to store a to-be-decrypted file to be sent. The memory 503 may be further configured to store the root key ciphertext, the first keying material, the key, and the like.

Figure 6:
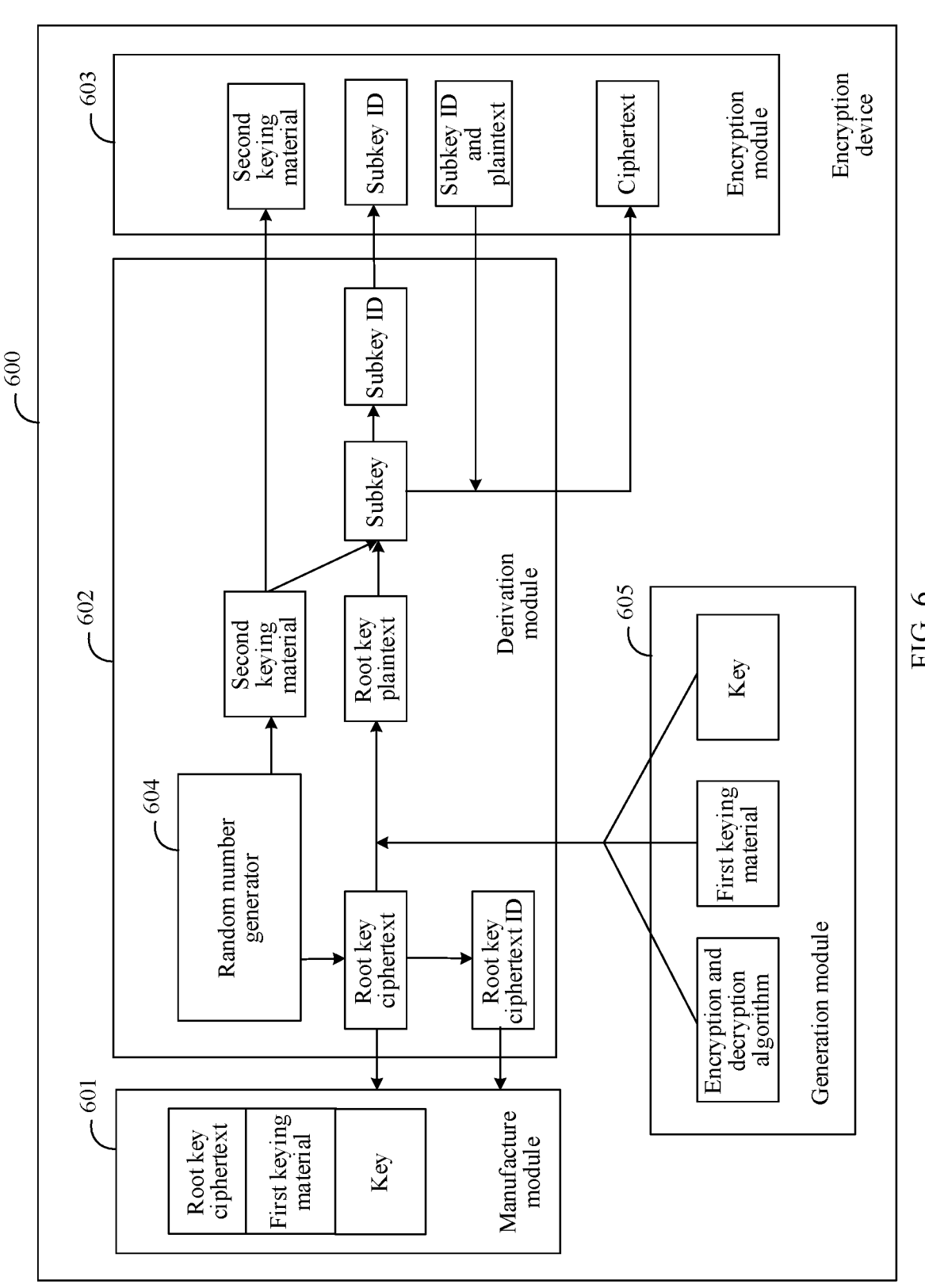
FIG. 6 is a second schematic diagram of a structure of an encryption device according to this application.

During actual application, the encryption device 500 may include a plurality of modules. The plurality of modules may be different programs run by the processor 501. Alternatively, the encryption device 500 may include a plurality of devices. The plurality of devices are in one-to-one correspondence with the plurality of modules. Each device is configured to perform a function of a corresponding module. The following describes functions of the plurality of modules by using an example in which the plurality of modules are different programs run by the processor 501. For example, FIG. 6 is a second schematic diagram of a structure of an encryption device according to this application. As shown in FIG. 6, the encryption device 600 includes a manufacturing module 601, a derivation module 602, an encryption module 603, and a generation module 605.

The generation module 605 is configured to generate a first keying material and a key. The first keying material and the key may be random numbers generated by a random number generator. The generation module 605 is configured to send the first keying material and the key to the derivation module 602. The generation module 605 is further configured to specify an encryption and decryption algorithm type for the derivation module 602. The encryption and decryption algorithm type may be the foregoing SM1, SM4, or AES, or the like. Different encryption and decryption algorithm types may use a same first keying material and key, or may use different first keying materials and keys. When different algorithm types use different first keying materials and keys, the derivation module 602 may receive a plurality of groups of key parameters. Each group of key parameters includes a first keying material and a key. The plurality of groups of key parameters are in one-to-one correspondence with a plurality of algorithm types.

The derivation module 602 includes a random number generator 604. The derivation module 602 may generate a second keying material and a root key ciphertext based on a first request of the encryption module 603. After receiving the first request, the random number generator 604 is configured to generate the second keying material and the root key ciphertext. The first request may carry first algorithm type indication information. The first algorithm type indication information may indicate a target encryption and decryption algorithm. Alternatively, the first algorithm type indication information simply indicates Chinese cryptographic algorithms or international cryptographic algorithms. For example, when the first algorithm type indication information indicates the Chinese cryptographic algorithms, the derivation module 602 may select one or more encryption and decryption algorithms from the Chinese cryptographic algorithms as the target encryption and decryption algorithm.

After determining the target encryption and decryption algorithm, the derivation module 602 is configured to obtain a root key plaintext based on the target encryption and decryption algorithm, the root key ciphertext, the first keying material, and the key. In FIG. 6, the derivation module 602 uses a random number generated by the random number generator 604 as the root key ciphertext. Therefore, the derivation module 602 may use the same root key ciphertext regardless of the target encryption and decryption algorithm. For example, when the target encryption and decryption algorithm is a Chinese cryptographic algorithm or an international cryptographic algorithm, the derivation module 602 uses the same root key ciphertext. Therefore, in a process of manufacturing a network device, there is no need to program different root key ciphertexts, to avoid a difference inside hardware. This reduces manufacturing costs of the network device.

The derivation module 602 is further configured to obtain a root key ciphertext identifier (ID) based on the root key ciphertext. The derivation module 602 is configured to send the root key ciphertext ID to the manufacturing module 601.

The manufacturing module 601 is configured to receive the root key ciphertext ID from the derivation module 602. The manufacturing module 601 is further configured to request the root key ciphertext, the first keying material, and the key from the derivation module 602 based on the root key ciphertext ID. After receiving the root key ciphertext, the first keying material, and the key, the manufacturing module 601 may program the root key ciphertext, the first keying material, and the key in an OTP storage area of the network device. During actual application, the manufacturing module 601 may further program second algorithm type indication information and/or second encryption indication information in the OTP storage area of the network device. For descriptions of the second algorithm type indication information and the second encryption indication information, refer to the foregoing related descriptions of the network device.

The derivation module 602 is further configured to derive the root key plaintext based on the second keying material, to obtain a subkey. The derivation module 602 is configured to generate a subkey ID based on the subkey. The derivation module 602 is further configured to send the subkey ID to the encryption module 603.

The encryption module 603 is configured to send the subkey ID and a plaintext to the derivation module 602. The derivation module 602 is configured to encrypt the plaintext based on the subkey corresponding to the subkey ID, to obtain a ciphertext. The derivation module 602 is configured to send the ciphertext to the encryption module 603. The derivation module 602 is further configured to send the second keying material to the encryption module 603. The encryption module 603 is configured to obtain a to-be-decrypted file based on the second keying material and the ciphertext. During actual application, the to-be-decrypted file may further include the first algorithm type indication information and/or first encryption indication information. For descriptions of the first algorithm type indication information and the first encryption indication information, refer to the foregoing related descriptions of the network device. The encryption module 603 may store the to-be-decrypted file in a memory (not shown). The encryption device 600 may further include a transceiver (not shown). The transceiver is configured to send the to-be-decrypted file to the network device.

Figure 7:
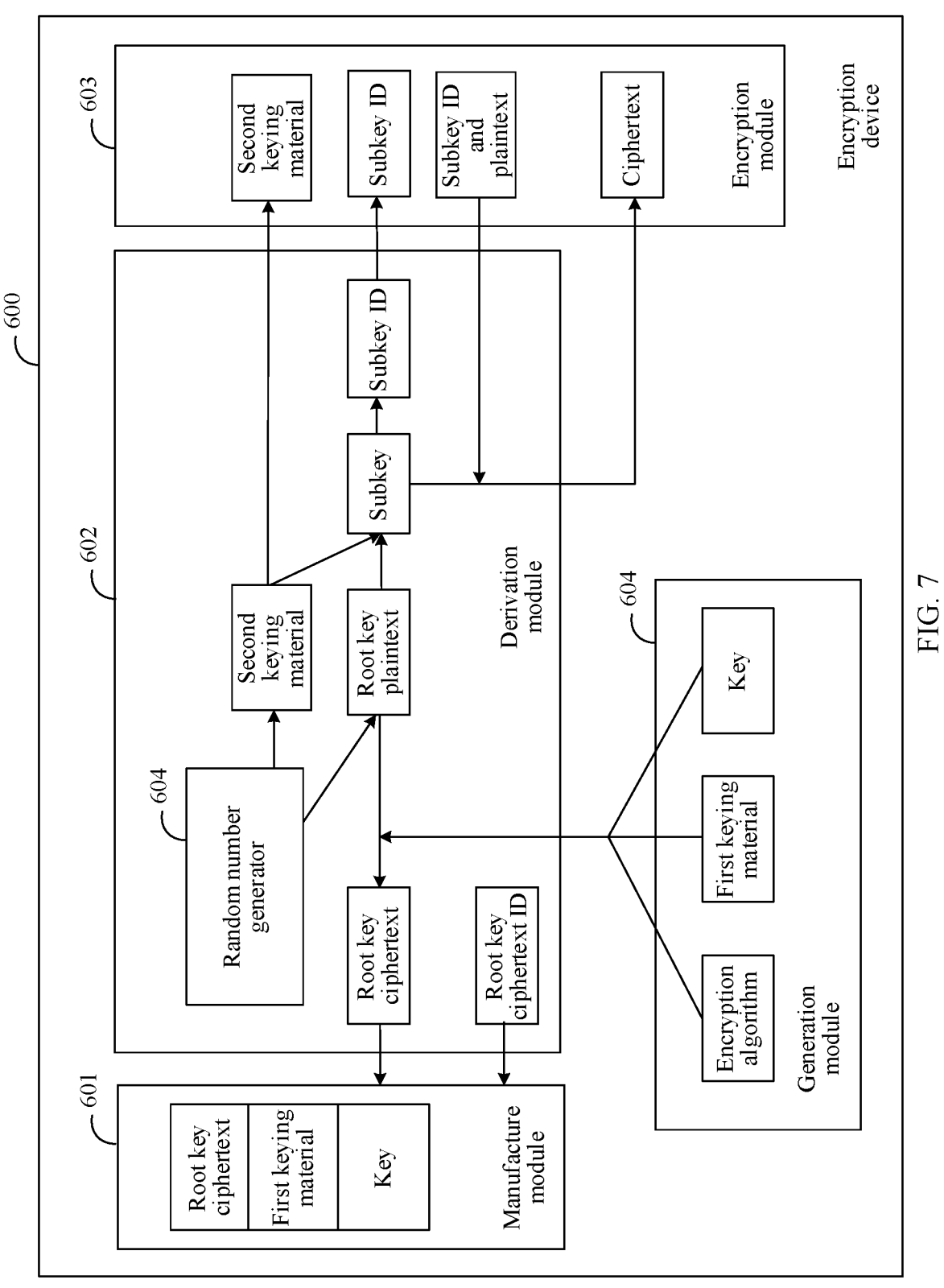
FIG. 7 is a third schematic diagram of a structure of an encryption device according to this application.

In the foregoing descriptions of FIG. 6, the derivation module 602 uses the random number generated by the random number generator 604 as the root key ciphertext. During actual application, the derivation module 602 may alternatively use the random number generated by the random number generator 604 as the root key plaintext. For example, FIG. 7 is a third schematic diagram of a structure of an encryption device according to this application. As shown in FIG. 7, the encryption device includes a manufacturing module 601, a derivation module 602, an encryption module 603, and a generation module 605. In FIG. 7, the derivation module 602 uses a random number generated by a random number generator 604 as a root key plaintext. After determining a target encryption and decryption algorithm, the derivation module 602 obtains a root key ciphertext by using the root key plaintext, the target encryption and decryption algorithm, a first keying material, and a key. For other descriptions of the modules, refer to the foregoing related descriptions in FIG. 6.

It should be understood that, FIG. 6 and FIG. 7 only use the network device in FIG. 4 as an example to describe the encryption device. During actual application, for the descriptions in FIG. 6 and FIG. 7, refer to the foregoing related descriptions in FIG. 1 to FIG. 5.

For example, in FIG. 6 and FIG. 7, the derivation module 602 derives the root key plaintext by using a second keying material, to obtain a subkey. During actual application, when the network device directly decrypts a ciphertext by using the root key plaintext, the derivation module 602 may not need to generate the second keying material. In this case, the derivation module 602 directly encrypts a plaintext by using the root key plaintext.

For example, in FIG. 6 and FIG. 7, the manufacturing module 601 receives the root key ciphertext, the first keying material, and the key from the derivation module 602. During actual application, when a to-be-decrypted file carries the first keying material and the key, the derivation module 602 may send the first keying material and the key to the encryption module 603. The encryption module 603 is configured to obtain the to-be-decrypted file based on the first keying material, the key, and the ciphertext.

Figure 8:
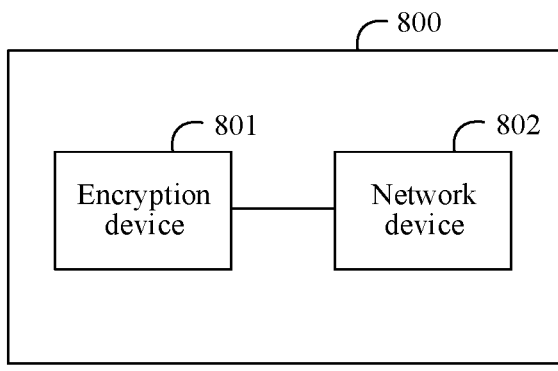
FIG. 8 is a schematic diagram of a structure of an encryption system according to this application.

The foregoing describes the network device and the encryption device provided in this application, and the following describes an encryption system provided in this application. FIG. 8 is a schematic diagram of a structure of an encryption system according to this application. As shown in FIG. 8, the encryption system 800 includes an encryption device 801 and a network device 802. The encryption device 801 is configured to encrypt a plaintext based on a root key plaintext, to obtain a ciphertext. The encryption device 801 is configured to send a to-be-decrypted file to the network device 802. The to-be-decrypted file includes the ciphertext. The network device 802 includes a chip and a receiver. The chip includes a hardware encryption and decryption component and an OTP storage area. The OTP storage area stores related information of the root key plaintext. The network device 802 is configured to obtain a root key plaintext from the OTP storage area. The network device 802 is further configured to decrypt the ciphertext by using the hardware encryption and decryption component and the root key plaintext, to obtain a plaintext. It should be understood that, for related descriptions of the network device 802, refer to the foregoing descriptions of the network device in FIG. 1 to FIG. 4. For related descriptions of the encryption device 801, refer to the foregoing descriptions of the encryption device in FIG. 5 to FIG. 7.

Figure 9:
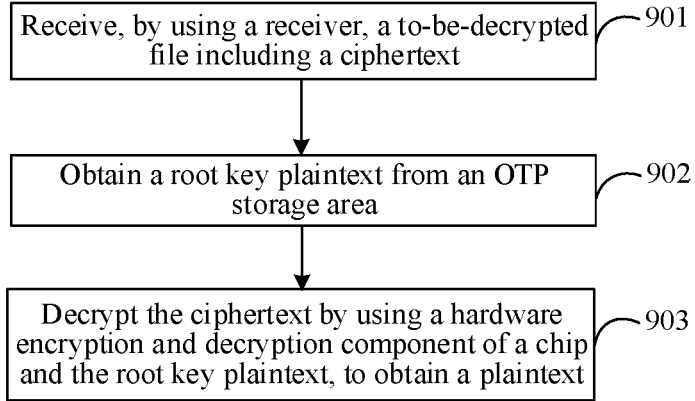
FIG. 9 is a schematic flowchart of a data decryption method according to this application.

The foregoing describes the encryption system provided in this application, and the following describes a data decryption method provided in this application. FIG. 9 is a schematic flowchart of a data decryption method according to this application. As shown in FIG. 9, the data decryption method in this application includes the following steps.

In step 901, a network device receives, by using a receiver, a to-be-decrypted file including a ciphertext. The network device includes the receiver, an OTP storage area, and a hardware encryption and decryption component. The network device receives the to-be-decrypted file by using the receiver. The network device may further include an off-chip memory. The off-chip memory is configured to store the to-be-decrypted file.

In step 902, the network device obtains a root key plaintext from the OTP storage area. The OTP storage area and the hardware encryption and decryption component may be integrated into a chip. The OTP storage area stores related information of the root key plaintext. The related information of the root key plaintext may be written by the network device before delivery. The related information of the root key plaintext may be a root key plaintext, a root key ciphertext, or the like. The OTP storage area is protected by the chip. Data in the OTP storage area cannot be modified or read by an application program outside the chip.

In step 903, the network device decrypts the ciphertext by using the hardware encryption and decryption component of the chip and the root key plaintext, to obtain a plaintext. When the OTP storage area stores the root key plaintext, the network device obtains the root key plaintext from the OTP storage area by using the hardware encryption and decryption component. The network device obtains the ciphertext from the off-chip memory by using the hardware encryption and decryption component. The network device decrypts the ciphertext by using the hardware encryption and decryption component and the root key plaintext, to obtain the plaintext.

It should be understood that for related descriptions of the network device, refer to the foregoing related descriptions of the network device in FIG. 1 to FIG. 4. For example, the to-be-decrypted file further includes first encryption indication information. The network device determines, by using the first encryption indication information, whether to decrypt the ciphertext in the to-be-decrypted file. For example, the to-be-decrypted file further includes first algorithm type indication information. The first algorithm type indication information indicates an encryption and decryption algorithm type of the ciphertext. The network device determines a target encryption and decryption algorithm based on the first algorithm type indication information. For example, the OTP storage area stores a root key ciphertext. The to-be-decrypted file further includes a first keying material and a key. The network device obtains the root key plaintext by using the hardware encryption and decryption component, the root key ciphertext, the first keying material, and the key.

Figure 10:
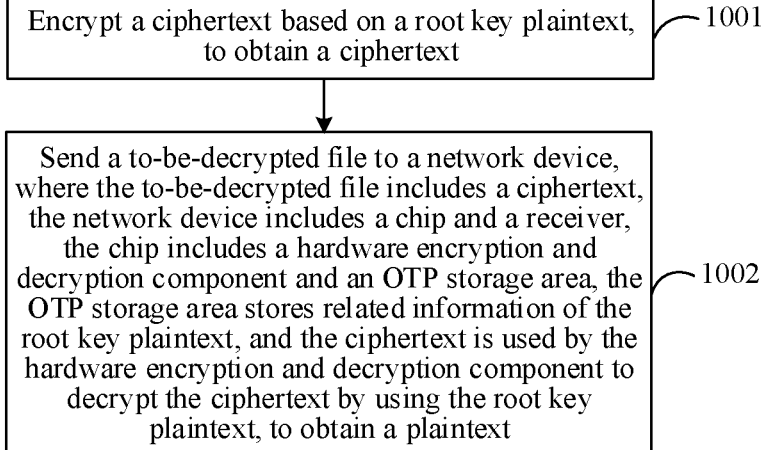
FIG. 10 is a schematic flowchart of a data encryption method according to this application.

The foregoing describes the data decryption method provided in this application, and the following describes a data encryption method provided in this application. FIG. 10 is a schematic flowchart of a data encryption method according to this application. As shown in FIG. 10, the data encryption method in this application includes the following steps.

In step 1001, an encryption device encrypts a plaintext based on a root key plaintext, to obtain a ciphertext. It should be understood that for related descriptions of the encryption device, refer to the foregoing related descriptions of the encryption device in FIG. 5 to FIG. 7.

In step 1002, the encryption device sends a to-be-decrypted file to a network device. The to-be-decrypted file includes the ciphertext. The network device includes a chip and a receiver. The chip includes a hardware encryption and decryption component and an OTP storage area. The OTP storage area stores related information of the root key plaintext. The ciphertext is used by the hardware encryption and decryption component to decrypt the ciphertext by using the root key plaintext, to obtain a plaintext. It should be understood that, for related descriptions of the network device, refer to the foregoing related descriptions of the network device in FIG. 1 to FIG. 4.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A network device, comprising:
   a chip comprising a hardware encryption and decryption circuit and a one-time programmable (OTP) storage area; and
   a receiver configured to receive a to-be-decrypted file, wherein the to-be-decrypted file comprises a ciphertext, wherein
      the hardware encryption and decryption circuit is configured to obtain a root key ciphertext from the OTP storage area, and decrypt the root key ciphertext using a first keying material and a key to obtain a root key plaintext, the to-be-decrypted file further comprises a second keying material, and the hardware encryption and decryption circuit is further configured to obtain a subkey from the root key plaintext using the second keying material and decrypt the ciphertext using the subkey to obtain a plaintext.

2. The network device according to claim 1, wherein the hardware encryption and decryption circuit is further configured to obtain the key and the first keying material from the to-be-decrypted file.

3. The network device according to claim 1, wherein:

the to-be-decrypted file further comprises first encryption indication information; and the hardware encryption and decryption circuit is further configured to determine, based on the first encryption indication information, whether to decrypt the ciphertext.

4. The network device according to claim 3, wherein:

the OTP storage area is configured to store second encryption indication information; and the hardware encryption and decryption circuit is further configured to determine, based on the first encryption indication information, whether to decrypt the ciphertext by:

determining, based on the first encryption indication information and the second encryption indication information, whether to decrypt the ciphertext, in response to the second encryption indication information and the first encryption indication information indicating that decryption is required, determining to decrypt the ciphertext, in response to the second encryption indication information indicating that decryption is required, and the first encryption indication information indicating that decryption is not required, sending an alarm, in response to the second encryption indication information and the first encryption indication information indicating that decryption is not required, determining not to decrypt the ciphertext, and in response to the second encryption indication information indicating that decryption is not required and the first encryption indication information indicating that decryption is required, sending the alarm.

5. The network device according to claim 1, wherein:

the to-be-decrypted file further comprises first algorithm type indication information;

the hardware encryption and decryption circuit is further configured to determine a target encryption and decryption algorithm in the hardware encryption and decryption circuit based on the first algorithm type indication information; and the hardware encryption and decryption circuit is configured to decrypt the ciphertext using the root key plaintext to obtain the plaintext by decrypting the ciphertext using the target encryption and decryption algorithm and the root key plaintext to obtain the plaintext.

6. The network device according to claim 5, wherein:

the OTP storage area comprises second algorithm type indication information, and an algorithm type indicated by the second algorithm type indication information covers an algorithm type indicated by the first algorithm type indication information; and the hardware encryption and decryption circuit is configured to determine the target encryption and decryption algorithm in the hardware encryption and decryption circuit based on the first algorithm type indication information by:

determining the target encryption and decryption algorithm in the hardware encryption and decryption circuit based on the first algorithm type indication information and the second algorithm type indication information.

7. The network device according to claim 1, wherein a plurality of encryption and decryption algorithms in the hardware encryption and decryption circuit are configured to share the root key ciphertext.

8. The network device according to claim 1, wherein the ciphertext is a basic input/output system (BIOS) ciphertext, an operating system (OS) ciphertext, or an application program ciphertext.

9. A method, applied to a network device comprising a receiver and a chip that includes a hardware encryption and decryption circuit and a one-time programmable (OTP) storage area, the method comprising:

receiving a to-be-decrypted file using the receiver, wherein the to-be-decrypted file comprises a ciphertext;

obtaining a root key ciphertext from the OTP storage area;

decrypting, by the hardware encryption and decryption circuit, the root key ciphertext using a first keying material and a key to obtain a root key plaintext, wherein the to-be-decrypted file further comprises a second keying material;

obtaining, by the hardware encryption and decryption circuit, a subkey from the root key plaintext using the second keying material; and decrypting, by the hardware encryption and decryption circuit, the ciphertext using the subkey to obtain a plaintext.

10. The method according to claim 9, further comprising:

before decrypting the root key ciphertext to obtain the root key plaintext:

obtaining the key and the first keying material from the to-be-decrypted file.

11. The method according to claim 9, wherein:

the to-be-decrypted file further comprises first encryption indication information; and the method further comprises, before the decrypting the ciphertext using the hardware encryption and decryption circuit and the root key plaintext to obtain the plaintext:

determining, based on the first encryption indication information, whether to decrypt the ciphertext.

12. The method according to claim 11, wherein the OTP storage area comprises second encryption indication information; and determining, based on the first encryption indication information, whether to decrypt the ciphertext comprises:

determining, based on the first encryption indication information and the second encryption indication information, whether to decrypt the ciphertext, in response to the second encryption indication information and the first encryption indication information indicating that decryption is required, determining to decrypt the ciphertext, in response to the second encryption indication information indicating that decryption is required, and the first encryption indication information indicating that decryption is not required, sending an alarm, in response to the second encryption indication information and the first encryption indication information indicating that decryption is not required, determining not to decrypt the ciphertext, and in response to the second encryption indication information indicating that decryption is not required, and the first encryption indication information indicating that decryption is required, sending the alarm.

13. The method according to claim 9, wherein:

the to-be-decrypted file further comprises first algorithm type indication information; and the method further comprises, before decrypting, by the hardware encryption and decryption circuit, the ciphertext using the subkey to obtain the plaintext: determining a target encryption and decryption algorithm in the hardware encryption and decryption circuit based on the first algorithm type indication information; and decrypting, by the hardware encryption and decryption circuit, the ciphertext using the subkey to obtain the plaintext comprises: decrypting the ciphertext based on the target encryption and decryption algorithm and the subkey to obtain the plaintext.

14. The method according to claim 13, wherein:

the OTP storage area comprises second algorithm type indication information;

an algorithm type indicated by the second algorithm type indication information covers an algorithm type indicated by the first algorithm type indication information; and determining the target encryption and decryption algorithm in the hardware encryption and decryption circuit based on the first algorithm type indication information comprises: determining the target encryption and decryption algorithm in the hardware encryption and decryption circuit based on the first algorithm type indication information and the second algorithm type indication information.

15. A non-transitory computer readable medium with instructions stored thereon, wherein the instructions, when executed by at least one processor, enable a device to perform:

receiving a to-be-decrypted file using a receiver, wherein the to-be-decrypted file comprises a ciphertext;

obtaining a root key ciphertext from a one-time programmable (OTP) storage area;

decrypting the root key ciphertext using a first keying material and a key to obtain a root key plaintext, wherein the to-be-decrypted file further comprises a second keying material;

obtaining a subkey from the root key plaintext using the second keying material; and decrypting the ciphertext using the subkey to obtain a plaintext.

16. The non-transitory computer readable medium according to claim 15, wherein the instructions, when executed by the at least one processor further enable the device to perform:

before decrypting the root key ciphertext to obtain the root key plaintext, obtaining the key and the first keying material from the to-be-decrypted file.

17. The non-transitory computer readable medium according to claim 15, wherein:

the to-be-decrypted file further comprises first encryption indication information; and the instructions, when executed by the at least one processor, further enable the device to perform, before the decrypting the ciphertext using the subkey to obtain the plaintext:

determining, based on the first encryption indication information, whether to decrypt the ciphertext.

18. The non-transitory computer readable medium according to claim 17, wherein the OTP storage area comprises second encryption indication information; and determining, based on the first encryption indication information, whether to decrypt the ciphertext comprises:

determining, based on the first encryption indication information and the second encryption indication information, whether to decrypt the ciphertext, in response to the second encryption indication information and the first encryption indication information indicating that decryption is required, determining to decrypt the ciphertext, in response to the second encryption indication information indicating that decryption is required, and the first encryption indication information indicating that decryption is not required, sending an alarm, in response to the second encryption indication information and the first encryption indication information indicating that decryption is not required, determining not to decrypt the ciphertext, and in response to the second encryption indication information indicating that decryption is not required, and the first encryption indication information indicating that decryption is required, sending the alarm.

19. The non-transitory computer readable medium according to claim 15, wherein:

the to-be-decrypted file further comprises first algorithm type indication information; and the instructions, when executed by the at least one processor, further enable the device to perform, before decrypting the ciphertext using the subkey to obtain the plaintext:

determining a target encryption and decryption algorithm based on the first algorithm type indication information, and decrypting the ciphertext using the subkey to obtain the plaintext comprises: decrypting the ciphertext based on the target encryption and decryption algorithm and the subkey to obtain the plaintext.

20. The non-transitory computer readable medium according to claim 19, wherein:

the OTP storage area comprises second algorithm type indication information;

an algorithm type indicated by the second algorithm type indication information covers an algorithm type indicated by the first algorithm type indication information; and determining the target encryption and decryption algorithm based on the first algorithm type indication information comprises: determining the target encryption and decryption algorithm based on the first algorithm type indication information and the second algorithm type indication information.

* * * * *